United States Patent [19]
Smith et al.

[11] 4,158,715
[45] Jun. 19, 1979

[54] LASER RECORDING FILM WITH OPAQUE COATING

[75] Inventors: Michael R. Smith, Thousand Oaks; David B. Congleton, San Pedro; Arthur S. Diamond, Palos Verdes, all of Calif.

[73] Assignee: The Singer Company, New York, N.Y.

[21] Appl. No.: 870,155

[22] Filed: Jan. 17, 1978

Related U.S. Application Data

[63] Continuation-in-part of Ser. No. 738,920, Nov. 4, 1976, abandoned.

[51] Int. Cl.² .............................................. B32B 27/36
[52] U.S. Cl. ................................... 428/412; 428/480; 420/538; 428/913; 346/76 L; 427/145; 428/463
[58] Field of Search ............... 428/411, 412, 480, 538; 346/76 L

[56] References Cited

U.S. PATENT DOCUMENTS

| | | | |
|---|---|---|---|
| 3,787,210 | 1/1974 | Roberts | 96/27 E |
| 3,787,873 | 1/1974 | Sato et al. | 346/1 |
| 3,924,049 | 12/1975 | Truitt et al. | 428/411 |
| 3,962,513 | 6/1976 | Eames | 428/480 |

Primary Examiner—P. C. Ives
Attorney, Agent, or Firm—Charles R. Lewis

[57] ABSTRACT

A real-time laser recording film having a plastic/dye coating on one side thereof provides improved image sharpness and visual qualities. The film fabrication is compatible with continuous production techniques to provide an economical, high quality film.

6 Claims, 3 Drawing Figures

LASER RECORDING FILM WITH OPAQUE COATING

CROSS REFERENCE TO RELATED APPLICATIONS

This application is a continuation in part of copending application Ser. No. 738,920 filed Nov. 4, 1976, now abandoned.

BACKGROUND OF THE INVENTION

1. Field of the Invention

The present invention relates to laser recording film of the type having an opaque coating deposited on one side. A selectively directed laser beam generates transparent areas on the film for projection onto a viewing screen.

2. Description of the Prior Art

Laser recording films are employed in a species of visual presentation equipment adapted to display large amounts of data on a real time basis. The visual presentation equipment includes a computer controlled laser beam which illuminates selected surface portions of the film to change the light transmissibility of the illuminated surface portion from opaque to substantially transparent. Large amounts of data, including alpha numeric characters and graphical depictions, can be rapidly "written" onto the film. Projection means, including a tungsten filament light source and projection optics, form an image from the "written" information for projection onto a viewing screen. A more detailed explanation of the visual presentation equipment may be had by refering to U.S. Pat. No. 3,961,334, the disclosure of which is incorporated herein.

Heretofor laser recording films have been fabricated from a transparent film substrate having an opaque metallic coating applied to one side thereof. The film substrate may be a standard 35 mm format polyester film. A variety of metals, including bismuth and copper, have proven satisfactory. A transparent plastic or lacquer coating may be applied to the metallic coating to provide protection against abrasion.

Metal coated laser recording films can be fabricated using conventional thin film deposition techniques. The clean transparent film substrate is placed in an evacuation chamber and exposed to a source of metal vapors. The thickness of the metallic coating is accurately controlled by controlling the deposition duration and the metal evaporation rate. Coating thicknesses in the range of 0.05 microns to 0.10 microns are preferred. As is well known, conventional thin film deposition is a batch process requiring extreme cleanliness and expensive vacuum deposition equipment. A high degree of skill is necessary to produce consistently uniform coatings.

When a surface portion of the laser recording film is irradiated by a laser beam having a circular cross section, the temperature of the metal within the irradiated area quickly rises to the metal's melting point. Surface tension then causes the molten metal to migrate in a radially outward direction to the periphery of the irradiated area to form an aperture or "window". The molten metal concentrates at the periphery in a random manner and forms an irregular peripheral rim. Trailings or globules of metal which do not migrate to the rim zone adhere in a random manner to the transparent film substrate within the aperture and diminish light transmissibility thru the aperture. The molten metal may also roughen the film surface within the aperture and alter the light transmissibility of the film substrate.

While the performance of metalized laser recording films have been generally satisfactory, the peripheral rim surrounding the aperture, the presence of globules within the aperture, and the roughened film substrate surface within the aperture limit the sharpness and visual qualities of the projected image. Also thin film vapor deposition techniques are a batch rather then a continuous process and require a large capital investment in vacuum production equipment.

Applicant's invention provides a laser recording film with an opaque, plastic/dye coating having improved aperture formation characteristics to provide improved projection image sharpness and visual quality. The applicant's laser recording film can be economically produced on a continuous process basis compatible with standard wet coating film manufacturing machinery.

SUMMARY OF THE INVENTION

A laser recording film having a transparent film substrate and an opaque coating applied to one side thereof. The coating constituents are dyes homogeneously dissolved in a plastic binder.

BRIEF DESCRIPTION OF THE DRAWINGS

The present invention will be fully understood from consideration of the following detailed description of the preferred embodiment taken in conjunction with the accompanying drawings, in which like reference characters refer to like structure in the several view, and wherein.

DESCRIPTION OF THE PREFERRED EMBODIMENT

Figure 1:
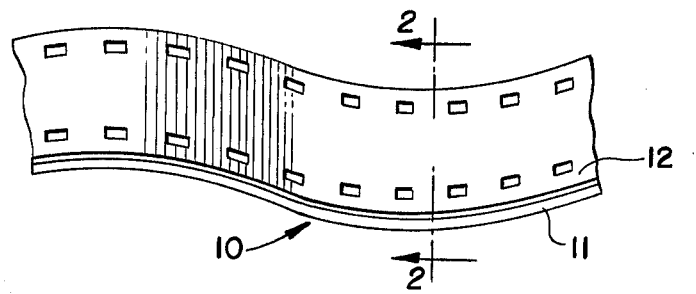
FIG. 1 is a perspective view of an exemplary length of laser recording film.
Figure 2:
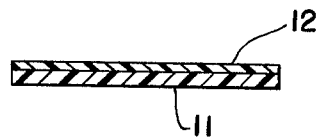
FIG. 2 is a cross section view of the laser recording film illustrated in FIG. 1 taken along line 2—2.

An exemplary portion of laser recording film, generally designated by the character 10, is illustrated in FIGS. 1 and 2. The film 10 includes a film substrate 11, and a coating 12 applied thereto. In the preferred embodiment shown, the dimensions of the film substrate 11 conform to the standard 35 mm photographic format. The film substrate 11 may be made from any one of a number of standard materials including polyester or polycarbonate that are transparent to the projector (not shown) light source (not shown).

Three preferred formulations of applicant's invention are shown in Table 1 (parts by weight). The coating is homogeneous and 12 is formulated from a combination of solvent dyes in a plastic binder to have a neutral black spectral transmissivity which is opaque to the projector (not shown) light source (not shown). The preferred soluble dyes in accordance with one embodiment of the present invention are dyes such as Iosol Black and Iosol Orange. Iosol is a trademark of the Allied Chemical Corp. The preferred plastic is nitrocellulose with tricresyl phosphate used as a plasticizer. Nitrocellulose is the preferred resin binder as laser beam irradiation tests have shown it produces a clean well defined aperture with superior optical quality and image sharpness.

The applicant's formulation is prepared in two parts. The first part, part A, is prepared by dissolving the two Iosol dyes in the quantity specified in Table 1 in an appropriate solvent, such as denatured alcohol. Complete solution is achieved at room temperature by prolonged stirring. The second part, part B, is prepared by blending the nitrocelulose resin binder and the tricresyl phophate plasticizer in the quantity specified in Table 1 in a suitable solvent, preferably ethyl acetate. Ethyl acetate is the preferred part B solvent as physical abrasion tests have shown improved film adhesion. Nitrocellulose powder is added to the mixture of tricresyl phosphate and ethyl acetate under vigorous agitation until complete solution of part B constituents is achieved. Part A and Part B are then mixed with stirring to achieve the applicant's coating formulation.

Figure 3:
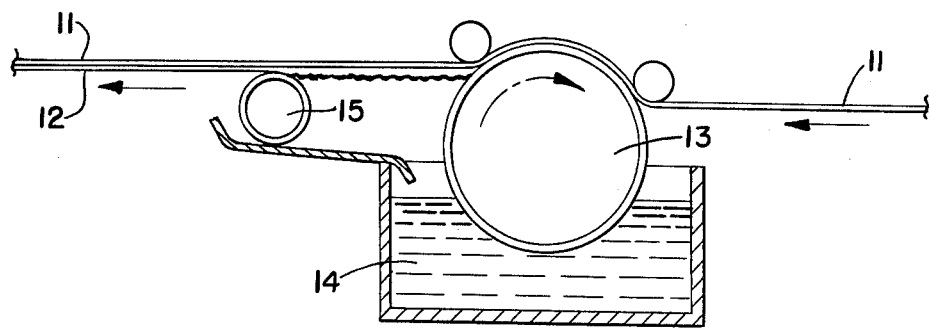
FIG. 3 is a cross section view of a formulation application technique.

Applicant's coating formulation may be applied to the film substrate 11 using any one of a number of well known techniques, such as: spraying, brushing, flow coating, reverse-roll coating, wire-wound rod coating, and dried to produce the final coating 12. One continuous production technique which provides for the metered application of applicant's formulation to the film substrate 11 utilizes a wire-wound rod as the metering device as shown in FIG. 3. An applicator roll 12, rotating in a reservoir or pan of coating solution 14 applies an excess of applicant's formulations to a web of film substrate material 11 moving in the counter direction. A rotating wire-wound rod 15 positioned after the applicator roll meters the final coating thickness by doctoring off excess formulation material. The final coating thickness 12 is determined by the diameter of the spirally-wound wire on the coating rod 15. The wet doctored coating levels itself by virtue of low viscosity and thereby a uniform coating is achieved. The coated film 12 is then dried with heated air to drive off the solvents and produce the completed laser recording film having the dyes homogeneously dissolved within the plastic layer. The parts by weight of the solvent-free dried coating 12 is shown in Table 2 and corresponds to the formulations shown in Table 1.

TABLE 1

| PART A | Parts by Weight | | |
|---|---|---|---|
| | (1) | (2) | (3) |
| Denatured alcohol | 50.54 | 48.61 | 46.80 |
| Iosol Black | 8.80 | 11.67 | 14.33 |
| Iosol Orange | 1.73 | 2.31 | 2.84 |
| PART B | | | |
| Tricresyl Phosphate | 4.55 | 4.36 | 4.20 |
| Ethyl Acetate | 25.27 | 24.30 | 23.40 |
| Nitrocellulose (RS-½ second) | 9.11 | 8.75 | 8.43 |
| TOTALS | 100.00 | 100.00 | 100.00 |

TABLE 2

| | Parts by Weight | | |
|---|---|---|---|
| | (1) | (2) | (3) |
| Iosol Black | 36.39 | 43.10 | 48.10 |
| Iosol Orange | 7.15 | 8.52 | 9.53 |
| Tricresyl phosphate | 18.80 | 16.09 | 14.09 |
| Nitrocellulose | 37.66 | 32.29 | 28.28 |
| TOTALS | 100.00 | 100.00 | 100.00 |

Using the above application technique, satisfactory coatings 12 in the range of four to eleven microns in thickness are obtained.

Laser recording films produced in accordance with the applicant's invention as described above have improved aperture formation as compared to conventional metal coated laser recording films. When a selected portion of applicant's laser recording film is irradiated by a laser beam having a circular cross section, the temperature of the irradiated coating 12 quickly rises to the evaporation point of the coating to evaporate the coating and leave a clean aperture without a rim concentration or the presence of globules or trailings in the aperture and does not cause scarring of the underlying clear film 11 substrate. Although capable of absorbing sufficient coherent light during the laser recording step to produce a transparent record, the intensity of normal projection lamps (not shown) radiation is insufficient to cause overheating or buckling of the recording film 10. Laser recording films in accordance with the applicant's invention can be produced on a continuous production basis to provide a high quality, economical film.

As will be apparent to those skilled in the art, various changes and modifications may be made to the preferred embodiment of the invention described herein without departing from the scope of the claimed invention.

I claim:

1. A laser recording film comprising:
   a flexible film substrate transparent to noncoherent projection radiation;
   a coating of self oxidizing nitrocellulose on said film substrate;
   said nitrocellulose having homogeneously dissolved dye therein to cause said nitrocellulose to have a neutral black spectral transmissivity to laser radiation.

2. The laser recording film in accordance with claim 1 wherein
   said nitrocellulose coating includes a plasticizer.

3. The laser recording film according to claim 2 wherein
   said plasticizer is tricresyl phosphate.

4. The laser recording film according to claim 2 wherein
   said dye constitutes 10 to 60 percent by weight of said coating,
   said nitrocellulose constitutes 20 to 40 percent by weight of said coating, and
   said plasticizer constitutes 14 to 19% by weight of said coating.

5. The laser recording film in accordance with claim 1 wherein
   said flexible transparent substrate is selected from the group consisting of polyester or polycarbonate.

6. A laser recording film comprising:
   a transparent film substrate selected from the group consisting of polyester or polycarbonate,
   a coating of self oxidizing nitrocellulose on said film substrate;
   said nitrocellulose having uniformly dissolved dye therein to cause said nitrocellulose to have a neutral black spectral transmissivity.

* * * * *